United States Patent [19]

Kelley et al.

[11] 4,400,500

[45] Aug. 23, 1983

[54] POLYAMINOESTER THERMOSETTING RESINS

[75] Inventors: Everett J. Kelley, Moorestown, N.J.; Casmir S. Ilenda, Hulmeville, Pa.

[73] Assignee: Rohm and Haas Company, Philadelphia, Pa.

[21] Appl. No.: 373,371

[22] Filed: Apr. 30, 1982

[51] Int. Cl.³ ............................................. C08G 69/26
[52] U.S. Cl. .................................... 528/345; 521/184; 524/602; 525/420; 528/205; 528/211; 528/341; 528/342
[58] Field of Search ............... 528/353, 345, 205, 211, 528/341, 342; 521/184; 524/602; 525/420

[56] References Cited

U.S. PATENT DOCUMENTS 4,180,632 12/1979 Ilenda .................................. 521/184

Primary Examiner—Harold D. Anderson

[57] ABSTRACT

This invention relates to polyaminoester thermosetting resins prepared by reacting polyalkylene maleate oligomers with polyfunctional amines via a Michael type addition reaction. The reaction is preferably conducted by a RIM process. Alpha, beta ethylenically unsaturated monomers, which are slow to react with amines, may be added to the reaction to copolymerize with the maleate functionality in a post cure step. The polyaminoester thermosetting resins are useful as plastics, coatings, resin modifiers, and elastomers.

7 Claims, No Drawings

POLYAMINOESTER THERMOSETTING RESINS

BACKGROUND OF THE INVENTION

1. Field of the Invention

This invention relates to thermosettable polymeric compositions useful as plastics, coatings, resin modifiers, and elastomers. The compositions are especially useful in the RIM process.

2. Description of the Prior Art

Ilenda, U.S. Pat. No. 4,180,632 shows polymers of acrylic acid monomers having an average acrylate functionality of at least 2.5 reacted with low molecular weight aliphatic amines to form polyamino esters. The Ilenda system is used for RIM.

U.S.S.R. Pat. No. 158,066 (1962) shows polyethylene maleates.

3. Cross Reference to Related Applications

Related application U.S. patent application Ser. No. 373,372, filed on Apr. 30, 1982 shows acrylic and methacrylic terminated maleate oligomers which are cross-linkable with amines.

Related application U.S. patent application Ser. No. 373,373, filed on Apr. 30, 1982 shows acrylate terminated maleate oligomers reacted with polyfunctional amines.

SUMMARY OF THE INVENTION

Although the prior Ilenda system provides thermosetting resins, especially for RIM, of excellent properties, for certain applications a more economical process using more available raw materials would be desirable.

It is therefore an object of the present invention to provide novel thermosetting compositions which are prepared from more available raw materials than the Ilenda process.

A further object is to prepare RIM compositions having improved properties as compared to prior RIM compositions.

These objects and others as will become apparent from the following description, are achieved by the present invention which comprises thermosetting polymer compositions comprised of the reaction product of one or more oligomers of the formula

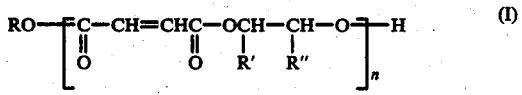

wherein
n=2–10
R=alkyl, hydroxyalkyl, or acyloxyalkyl
R' and R''=H, $CH_3$, $C_2H_5$, $CH_2Cl$, $CH_2Br$, or $C_6H_5$, $-CH_2OCOCH=CH_2$, $-CH_2OCOC(CH_3)=CH_2$, $-CH_2OCH_2CH=CH_2$, $-CH_2OC_4H_9$, or $R'+R''=-C_4H_8-$ with one or more polyamines in the optional presence of alpha, beta ethylenically unsaturated monomers such as styrene or methyl methacrylate which are slow to react with amines and are copolymerized with the maleate functionality in a post cure.

DETAILED DESCRIPTION OF THE INVENTION AND THE PREFERRED EMBODIMENTS

The polyalkylene maleate oligomers of the invention contain 2–10 maleate functional groups, have a molecular weight of 300 to 2,000, and are prepared by reaction of an initiator, maleic anhydride, and an epoxy compound in certain ratios.

Among the epoxy compounds which can be used, ethylene oxide is preferred, but other epoxides which can be used include propylene, butylene, isobutylene and styrene oxides, epichlorohydrin, glycidyl acrylate or methacrylate, epibromohydrin, allyl glycidyl ether, phenylglycidyl ether, butyl glycidyl ether, cyclohexane oxide, or mixtures of such epoxides.

The initiator can be methanol, ethanol, ethylene glycol, water, acetic acid, or other alcohols or carboxylic acids.

A wide variety of catalysts can be employed with the preferred catalyst being quaternary ammonium salts such as tetramethylammonium bromide, calcium, magnesium, and lithium halides, and tertiary amines.

A minor amount of maleic anhydride can be replaced by other carboxylic acid anhydrides such as phthalic, succinic, tetrahydrophthalic, hexahydrophthalic, itaconic, citraconic, alpha-methylene glutaric, and the like. Mixtures can also be used.

The reaction is conducted at a temperature of about 50° to 120° C., and more preferably at 70° to 100° C., by introducing the raw materials all at once or by adding the initiator to the molten maleic anhydride and any other anhydride, then adding the epoxy compound at a controlled rate to complete the polymerization.

The reaction can be conducted in the absence or presence of a solvent such as benzene, toluene, and the like.

In the preparation of the thermosetting resins by the RIM process, the polyamines employed are selected from the group consisting of:

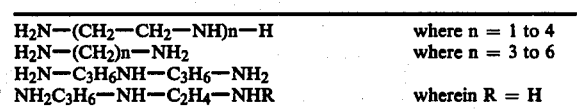

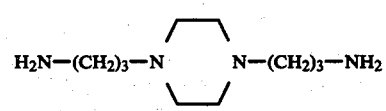

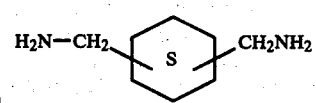

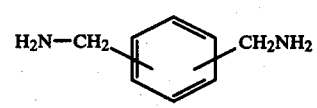

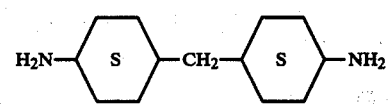

These polyamines and the oligomers react rapidly via an exothermic Michael type addition reaction to produce a thermosetting polymeric product, preferably in the absence of a catalyst, although a catalyst may be used in certain cases, especially when optional additional comonomers such as styrene or methyl methacrylate are used.

In such instances, suitable free-radical initiators such as peroxides or azo compounds are employed to promote copolymerization during a post cure.

The thermosettable compositions of the invention can include fillers, fibers, fiberglass, antioxidants, inhibitors, colorants and foaming agents.

The compositions of the invention can be used as plastics, coatings, resin modifiers, elastomeric products, but are especially useful in the RIM process wherein the liquid mixture is rapidly mixed and injected into a mold where it reacts and gels. In a post cure operation, the molding can be heated to cure and further crosslink the article.

The following non-limiting examples are presented to illustrate a few embodiments of the invention.

EXAMPLE 1

Polyethylene maleate (PEM 1-4-4, prepared from ethanol/maleic anhydride/ethylene oxide in a 1-4-4 molar ratio) (116.5 g.) was dissolved in styrene (20 g) containing di-tert-butyl peroxide (0.4 g).

Using rapid hand mixing with a spatula, bis(p-aminocyclohexyl)methane (63.5 g) was then added quickly in one quantity. The mix was stirred for 25 seconds at which time it was clear solution showing a vigorous exotherm. It was then rapidly poured into an open faced mold (on a glass plate) and allowed to set to a firm gel (ca 60 seconds). The ⅛" sheet was removed from the plate and oven post cured using the following schedule:
 80° C.—0.5 hour
 120° C.—1 hour
 150° C.—2 hours The product was a clear, amber colored, hard sheet with the following properties:
 Tensile Strength, psi 7970
 Tensile Modulus, psi 384,387
 Tensile Elongation % 3.5
 VICAT °C. (ASTM) 176
 Rockwell Hardness M-71
 Izod Impact (Notched) ft.lbs. 0.34

EXAMPLE 2

PEM 1-4-4 (32.6 gms.) along with di-tert-butylperoxide (0.1 gms.), tert-butyl peroxy-pivalate (Lupersol-11) (0.25 g) and 1,3 butanediol dimethacrylate (1.3 g) were dissolved in styrene (11.5 g) and to this solution was added m-xylenediamine (4.7 g) with rapid hand mixing for about 30 seconds. The mix was poured into an open faced mold (glass plate) and allowed to set to a firm gel. The ⅛" sheet was removed and post cured according to the following schedule:
 80° C.—0.5 hour
 110° C.—0.5 hour
 140° C.—0.5 hour
 170° C.—1.5 hours The product was a clear, amber colored, hard sheet with the following properties:
 Tensile, psi 7686
 Tensile Modulus, psi 319,736
 Tensile Elongation % 3.7
 Izod Impact (Notched) ft.lbs. 0.18
 Rockwell Hardness M-77

EXAMPLE 3

PEM 1-3-3 (6.3 g.), di-t-butyl peroxide (0.02 g.), and styrene (1 g.) are mixed to form a clear solution. m-Xylenediamine (2.7 g.) is then admixed with rapid stirring. The mixture exothermed to 102° C. in 60 seconds. It set to a gel in only 16 seconds which makes hand mixing and preparation of a sheet difficult. Post curing of the product as in (2) above results in a clear, amber colored, hard thermoset.

EXAMPLE 4

PEM 1-3-3 (24.2 g.), pentaerythritol triacrylate (16.3 g.), di-t-butylperoxide (0.1 g.), and methyl methacrylate (4.2 g.) are mixed to form a clear solution. Tetraethylene pentamine (5.4 g.) is then admixed with rapid stirring. The mixture is poured into an open faced mold (glass plate) and allowed to gel. Such mixture showed a peak exotherm of 58° C. in 70 seconds. Sheet post cured at
 80° C.—0.5 hour
 110° C.—0.5 hour
 140° C.—0.5 hour
 180° C.—1.5 hours
showed the following physical properties:
 Tensile Strength, psi 7207
 Tensile Modulus, psi 389,214
 Tensile Elongation % 2.1
 Izod Impact (Notched) ft.lbs. 0.18
 Rockwell Hardness M-85

EXAMPLE 5

PEM 1-4-4 (65.2 g.), di-tert-butyl peroxide (0.02 g.), and styrene (25.2 g.) were mixed to form a clear solution. Alumina trihydrate (Alcoa-C331)(60 g.) and milled fiber glass (Owens Corning #731-⅛") (14 g.) were then admixed to form a pasty slurry. Bis-(p-aminocyclohexyl)methane (PACM-20, duPont) (35.6 g.) was then added rapidly in one portion and vigorously hand mixed for 30 seconds using a spatula. The mix was poured without further delay into an open faced mold (6"×6"×⅛") to form a sheet sample. The gelled sheet was removed from the mold, stood overnight, and was post cured according to the following schedule:
 80° C.—0.5 hour
 120° C.—1 hour
 150° C.—2 hours The cured sheet showed the following physical properties:
 Tensile Strength, psi 6617
 Tensile Modulus, psi 794,126
 Tensile Elongation % 0.94
 Izod Impact (Notched) ft.lbs. 0.56
 Rockwell Hardness M-90

EXAMPLE 6

To 8.1 g. polyethylene maleate (PEM 1-3-3) containing 0.02 g. di-t-butyl peroxide was admixed 1.9 g. of 1,3-propylenediamine with rapid hand stirring. The mixture set to a firm gel almost immediately and showed a peak exotherm of 88° C. in 30 seconds. Postcuring of the product as in Example 5 resulted in a clear, hard, amber-colored thermoset.

While the invention has been described herein in great detail, various modifications and alterations should become readily apparent to those skilled in the art without departing from the spirit and scope of the invention.

What is claimed is:

1. A thermosetting polymer composition comprising the reaction product of one or more oligomers of the formula:

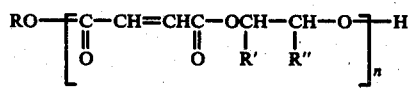 (I)

wherein n represents two to ten maleate units,

R represents alkyl, hydroxyalkyl, or acyloxyalkyl, and

R' and R" are —H, —CH$_3$, —C$_2$H$_5$, —CH$_2$Cl, —CH$_2$Br, —C$_6$H$_5$(phenyl), —CH$_2$OCOCH=CH$_2$, —CH$_2$OCOC(CH$_3$)=CH$_2$, CH$_2$OCH$_2$CH=CH$_2$, —CH$_2$OC$_4$H$_9$, or R' together with R" is —C$_4$H$_8$—(cyclic), with one or more polyamines.

2. Composition of claim 1 wherein the polyamine is selected from the group consisting of:

H$_2$N—(CH$_2$—CH$_2$—NH)$_n$—H where n is 1 to 4,
H$_2$N—(CH$_2$)$_n$—NH$_2$ where n is 3 to 6,
H$_2$N—C$_3$H$_6$NH—C$_3$H$_6$—NH$_2$,
NH$_2$C$_3$H$_6$—NH—C$_2$H$_4$NHR where R is —H or —C$_3$H$_6$NH$_2$,

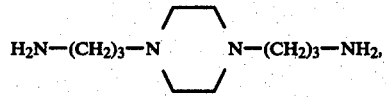

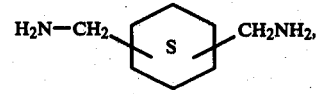

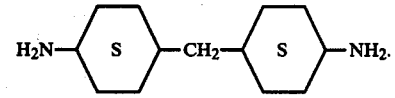

3. Composition in accordance with claim 1 further including one or more ethylenically unsaturated monomers which are copolymerizable with maleates but which react slowly or not at all with amines and remain available for a free-radical initiated copolymerization in the final stage of the thermoset formation.

4. Composition of claims 1 or 3 wherein the oligomer is polyethylene maleate containing two to four maleate repeating units.

5. Composition of claims 1 or 3 wherein the polyamine is selected from bis(p-aminocyclohexyl)methane, m-xylene diamine, 1,3-propylene diamine, N,N'-di(aminopropyl)-ethylene diamine, or tetraethylene pentamine.

6. Composition of claim 1 wherein the thermosetting polymer is further crosslinked by a post-reaction curing step.

7. Composition of claim 1 or 3 further comprising one or more of fillers, fibers, fiberglas, antioxidants, inhibitors, colorants or foaming agents.

* * * * *